US008804490B2

(12) United States Patent
Tatipamula et al.

(10) Patent No.: US 8,804,490 B2
(45) Date of Patent: *Aug. 12, 2014

(54) CONTROLLER PLACEMENT FOR FAST FAILOVER IN THE SPLIT ARCHITECTURE

(75) Inventors: Mallik Tatipamula, San Jose, CA (US); Neda Beheshti-Zavareh, San Jose, CA (US); Ying Zhang, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

This patent is subject to a terminal disclaimer.

(21) Appl. No.: 13/236,296

(22) Filed: Sep. 19, 2011

(65) Prior Publication Data
US 2013/0028073 A1    Jan. 31, 2013

Related U.S. Application Data

(60) Provisional application No. 61/513,140, filed on Jul. 29, 2011.

(51) Int. Cl.
H04J 1/16       (2006.01)
H04J 3/14       (2006.01)
H04L 1/00       (2006.01)
H04L 12/16      (2006.01)
H04L 12/24      (2006.01)
G01R 31/08      (2006.01)
G06F 11/00      (2006.01)
G08C 15/00      (2006.01)
H04L 12/56      (2006.01)

(52) U.S. Cl.
CPC ............. H04L 45/02 (2013.01); H04L 45/22 (2013.01); H04L 45/12 (2013.01); H04L 41/12 (2013.01); H04L 45/28 (2013.01); H04L 45/48 (2013.01)
USPC .......................................... 370/218

(58) Field of Classification Search
None
See application file for complete search history.

(56) References Cited

U.S. PATENT DOCUMENTS 5,898,843 A * 4/1999 Crump et al. .......... 710/100
6,865,609 B1 * 3/2005 Gubbi et al. .......... 709/230
6,928,484 B1   8/2005 Huai et al.
(Continued)

FOREIGN PATENT DOCUMENTS

EP          2552065          1/2013

OTHER PUBLICATIONS

N. McKeown, T. Anderson, H. Balakrishnan, g. Parulkar, L. Peterson, J. Rexford, S.Shenker, and J. Turner, "*Openflow: enabling innovation in campus networks*," Mar. 2008. http://openflow.org/documents/openflow1.1-allmerged-draft.pdf.

(Continued)

*Primary Examiner* — Hassan Phillips
*Assistant Examiner* — Prenell Jones
(74) *Attorney, Agent, or Firm* — Blakely, Sokoloff, Taylor & Zafman, LLP

(57) ABSTRACT

A method implemented by a network topology design system, the network topology design system including a processing device. The method to determine placement of a controller within a network with a split architecture where control plane components of the split architecture network are executed by a controller and the control plane components are separate from data plane components of the split architecture network. The placement of the controller is selected to minimize disruption of the split architecture network caused by a link failure, a switch failure or a connectivity loss between the controller and the data plane components.

10 Claims, 10 Drawing Sheets

(56) References Cited

U.S. PATENT DOCUMENTS

| | | | |
|---|---|---|---|
| 7,366,113 B1 | 4/2008 | Chandra et al. | |
| 7,366,989 B2 | 4/2008 | Naik et al. | |
| 7,415,211 B2* | 8/2008 | Feinberg et al. | 398/104 |
| 7,911,978 B1 | 3/2011 | Chandra et al. | |
| 8,018,860 B1* | 9/2011 | Cook | 370/244 |
| 8,255,660 B1 | 8/2012 | Chatterjee et al. | |
| 8,274,989 B1* | 9/2012 | Allan et al. | 370/432 |
| 8,311,014 B2 | 11/2012 | Valluri et al. | |
| 8,351,456 B2* | 1/2013 | Kadous et al. | 370/445 |
| 8,364,515 B1* | 1/2013 | Procopiuc | 705/7.29 |
| 8,559,314 B2 | 10/2013 | Yedavalli et al. | |
| 8,593,958 B2 | 11/2013 | Zhang | |
| 2002/0042274 A1* | 4/2002 | Ades | 455/445 |
| 2002/0067693 A1 | 6/2002 | Kodialam et al. | |
| 2002/0187770 A1* | 12/2002 | Grover et al. | 455/403 |
| 2003/0009598 A1* | 1/2003 | Gunluk et al. | 709/251 |
| 2003/0218989 A1* | 11/2003 | El-Amawy et al. | 370/255 |
| 2004/0179471 A1* | 9/2004 | Mekkittikul et al. | 370/218 |
| 2005/0060319 A1* | 3/2005 | Douglas et al. | 707/10 |
| 2005/0083844 A1 | 4/2005 | Zhu et al. | |
| 2005/0243711 A1* | 11/2005 | Alicherry et al. | 370/216 |
| 2006/0092935 A1* | 5/2006 | Lakshman et al. | 370/389 |
| 2006/0104199 A1* | 5/2006 | Katukam et al. | 370/216 |
| 2006/0126654 A1 | 6/2006 | Nilakantan et al. | |
| 2006/0153067 A1* | 7/2006 | Vasseur et al. | 370/217 |
| 2006/0215666 A1* | 9/2006 | Shepherd et al. | 370/400 |
| 2006/0291473 A1 | 12/2006 | Chase et al. | |
| 2007/0070909 A1 | 3/2007 | Reeve | |
| 2007/0086332 A1* | 4/2007 | Way et al. | 370/223 |
| 2007/0286218 A1 | 12/2007 | Zhang et al. | |
| 2009/0013091 A1 | 1/2009 | Zhang et al. | |
| 2009/0168768 A1 | 7/2009 | Chiabaut et al. | |
| 2009/0276666 A1 | 11/2009 | Haley et al. | |
| 2010/0142370 A1 | 6/2010 | Pan et al. | |
| 2010/0157794 A1* | 6/2010 | Nakash | 370/228 |
| 2010/0290396 A1* | 11/2010 | Karunakaran et al. | 370/328 |
| 2010/0332991 A1* | 12/2010 | Banerjee et al. | 715/736 |
| 2011/0274035 A1* | 11/2011 | Yadav et al. | 370/328 |
| 2011/0274037 A1* | 11/2011 | Jain et al. | 370/328 |
| 2011/0280213 A1* | 11/2011 | Calhoun et al. | 370/331 |
| 2011/0280568 A1* | 11/2011 | Dvir et al. | 398/13 |
| 2011/0286396 A1 | 11/2011 | Kato et al. | |
| 2011/0289137 A1 | 11/2011 | Ittah et al. | |
| 2012/0096085 A1 | 4/2012 | Yoon et al. | |
| 2012/0110393 A1* | 5/2012 | Shieh et al. | 714/48 |
| 2012/0195319 A1* | 8/2012 | Bragg et al. | 370/401 |
| 2012/0224588 A1* | 9/2012 | Germain et al. | 370/401 |
| 2012/0230199 A1 | 9/2012 | Chiabaut | |
| 2012/0263185 A1* | 10/2012 | Bejerano et al. | 370/401 |
| 2012/0303835 A1* | 11/2012 | Kempf et al. | 709/235 |
| 2012/0317058 A1 | 12/2012 | Abhulimen | |
| 2013/0028070 A1* | 1/2013 | Beheshti-Zavareh et al. | 370/217 |
| 2013/0028073 A1* | 1/2013 | Tatipamula et al. | 370/218 |
| 2013/0176859 A1* | 7/2013 | Stanislaus et al. | 370/242 |
| 2013/0215769 A1* | 8/2013 | Beheshti-Zavareh et al. | 370/252 |
| 2013/0346545 A1 | 12/2013 | Petersen et al. | |
| 2014/0016477 A1 | 1/2014 | Yedavalli et al. | |

OTHER PUBLICATIONS

Kin-Wah et al. "*On the Feasibility and Efficacy of Protection Routing in IP Networks,*" *University of Pennsylvania Technical Report*, Jul. 2009.

Beheshti, Neda , "Fast Failover for Control Traffic in Software-defined Networks", *Global Communications Conference*, 2012 IEEE; Dec. 3, 2012; pp. 2665-2670.

McKeown, Nick , et al., "OpenFlow: Enabling Innovation in Campus Networks", Mar. 14, 2008; pp. 1-6; retrived from Internet: URL: http://www.openflow.org/documents/openflow-wp-latest.pdf.

Zhang, Ying , et al., "On Resilience of Split-Architecture Networks", *Global Telecommunications Conference*, 2011, IEEE, Dec. 5, 2011, pp. 1-6.

Non-Final Office Action, U.S. Appl. No. 13/402,732, dated Dec. 4, 2013, 20 pages.

Notice of Allowance, U.S. Appl. No. 13/402,732, dated Apr. 11, 2014, 19 pages.

Non-Final Office Action, U.S. Appl. No. 13/294,559, dated May 29, 2014, 10 pages.

\* cited by examiner

US 8,804,490 B2

CONTROLLER PLACEMENT FOR FAST FAILOVER IN THE SPLIT ARCHITECTURE

CROSS-REFERENCE TO RELATED APPLICATIONS

The present application claims priority from U.S. Provisional Patent Application No. 61/513,140, filed on Jul. 29, 2011.

FIELD OF THE INVENTION

The embodiments of the invention are related to the organization and design of networks. Specifically, the embodiments of the invention relate to a method and system for determining placement of controllers for switches in a split architecture network with control de-coupled from forwarding.

BACKGROUND

A split-architecture network design introduces a separation between the control and forwarding components of a network. Among the use cases of such architecture are the access/aggregation domain of carrier-grade networks, mobile backhaul, cloud computing, and multilayer (L3 & L2 & L1, OTN, WDM) support, data centers, all of which are among the main building blocks of a network architecture. Therefore, proper design, management and performance optimization of these networks are of great importance.

Unlike the traditional network architecture, which integrates both the forwarding (data) and the control planes in the same box (network element), a split architecture network decouples these two planes and executes the control plane on servers that might be in different physical locations from the forwarding elements (switches). The use of a split architecture in a network enables the simplification of the switches implementing the forwarding plane and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

In a split architecture network, controllers collect information from switches, and compute and distribute the appropriate forwarding decisions to switches. Controllers and switches use a protocol to communicate and exchange information. An example of such protocol is OpenFlow (see www.openflow.org), which provides an open and standard method for a switch to communicate with a controller, and it has drawn significant interest from both academics and industry. FIG. 1 is a diagram showing an overview of the OpenFlow interface between a switch and a controller. The forwarding table in an OpenFlow switch is populated with entries consisting of: a rule defining matches for fields in packet headers; an action associated to the flow match; and a collection of statistics on the flow.

When an incoming packet matches a particular rule, the associated actions are performed on the packet. A rule contains key fields from several headers in the protocol stack, for example Ethernet MAC addresses, IP address, IP protocol, TCP/UDP port numbers as well as the incoming port number. To define a flow, all the available matching fields may be used. But it is also possible to restrict the matching rule to a subset of the available fields by using wildcards for the unwanted fields.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
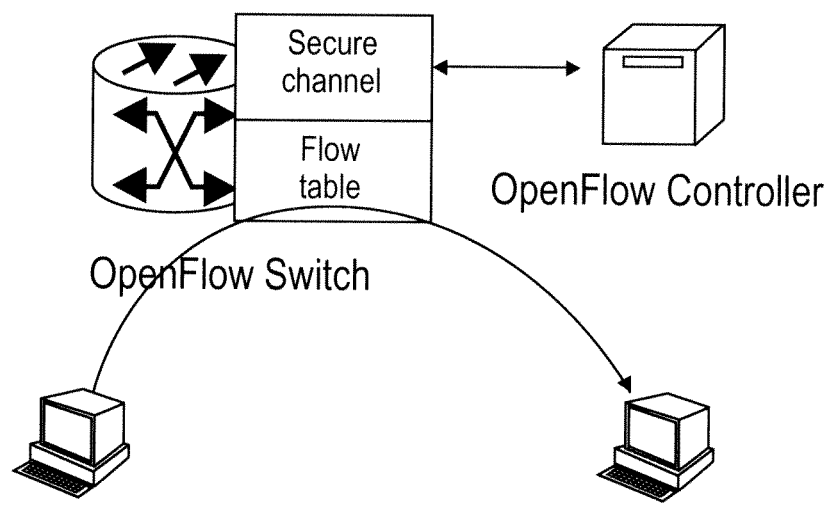
FIG. 1 is a diagram of one embodiment of an example architecture for a simple OpenFlow network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIG. 5. However, it should be understood that the operations of the flow diagrams in FIGS. 6, 7 and 8 can be performed by embodiments of the invention other than those discussed with reference to FIG. 5, and the embodiments discussed with reference to FIG.

5 can perform operations different than those discussed with reference to the flow diagrams of FIGS. 6, 7 and 8.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

As used herein resilience is the ability to provide and maintain an acceptable level of service in the face of faults and challenges to normal operation As used herein failure probability is the frequency with which an engineered system or component fails, expressed as the number of failures per hour, or the probability of each node fails in the long time.

In evaluating a network design, network resilience is an important factor, as a failure of a few milliseconds may easily result in terabyte data losses on high-speed links. In traditional networks, where both control and data packets are transmitted on the same link, the control and data information are equally affected when a failure happens. The existing work on the network resilience has therefore assumed an in-band control model, meaning that the control plane and data plane have the same resilience properties. However, this model is not applicable to split-architecture networks.

A link failure indicates that traffic traversing a link can no longer be transferred over the link. The failure can be either of a link between two switches or of a link between one controller and the switch to which it connects. In most cases, these links fail independently.

A switch failure indicates that the corresponding network element is unable to originate, respond, or forward any packet. Switch failures can be caused by software bugs, hardware failures, misconfigurations, and similar issues. In most cases, these switches fail independently.

Special cases include connectivity loss between a switch and a controller: A switch can lose connectivity to its controller due to failures on the intermediate links or nodes along the path between the switch and the controller. In one embodiment, whenever a switch cannot communicate with its assigned controller, the switch will discard all the packets on the forwarding plane managed by the controller, even though the path on the forwarding plane is still valid. In other embodiments, a subset of the traffic can be forwarded on forwarding plane or similar limited functionality can continue for a limited amount of time until a connection with an assigned controller or another controller is re-established. Therefore, this can be considered as a special case of switch failure.

The control packets in split-architecture networks can be transmitted on different paths from the data packet (or even on a separate network). Therefore, the reliability of the control plane in these networks is no longer directly linked with that of the forwarding plane. However, disconnection between the controller and the forwarding plane in the split architecture could disable the forwarding plane; when a switch is disconnected from its controller, it cannot receive any instructions on how to forward new flows, and becomes practically offline.

In one embodiment of a split-architecture network, each switch is pre-programmed with a path to reach the controller. Upon a link or node failure, the switch relies on the controller to detect such failure and recompute the new path for the switch. However, handling of all failures by the controller could result in large delays in the network. In another embodiment, pre-configuration of a backup path in each switch is used, so that if the primary output link does not work properly, the backup (secondary) output link could be used.

When a switch detects a failure in its outgoing link or its immediate upstream node, it immediately changes its route to the controller, and uses the backup path, i.e., outgoing interface, pre-programmed in the switch to reconnect to the controller. This takes place without a need to involve the controller and without any effects on the rest of the routes in the network and on the connections of the downstream nodes to the controller. In other words, there will only be a local change in the outgoing interface of the affected switch. All other connections in the network will remain intact. Without such backup paths, detecting of any failures in switches or links by the controller must be based on some implicit mechanisms, such as when Hello messages are not received by the controller from a switch. This introduces large delays in the network for detecting the exact location of the failure and re-establishing the controller-switch connections. If no backup path can be configured for a switch, then the connection of the switch to the controller will be interrupted in case of a failure in the primary path to the controller.

Using this protection scheme in a split architecture network, it is important to place the controller such that the connection between the control plane and the forwarding plane is less likely to be interrupted. A good selection of the controller location must result in reliable paths from the switches to the controller, in the sense that a large number of switches must have backup paths to the controller.

The embodiments of the invention provide a method and system for avoiding the disadvantages of the prior art. Existing proposals on split-architecture network design assume fixed locations for the network controllers. While there has been some research on the routing mechanisms between network controllers and switches, strategies for choosing optimized location for the network controller have not been developed. As a result, controller placement in split architectures does not take into account the possibility of disconnection between a controller and the forwarding plane and seek to minimize this possibility.

The embodiments of the invention overcome these disadvantages of the prior art. The embodiments of the invention place a single controller in a split architecture area, in a location selected to optimize the connection resilience between the controller and the switches in that area. No assumptions on how the partitioning of the split-architecture areas are made. The partitioning, if any, can be based on any arbitrary metrics such as geographical constraints. The embodiments of the invention encompass two example processes (i.e., an optimal process and a greedy process) for choosing the controller location to optimize the connection resilience between the controller and the switches, i.e., to maximize the number of switches with pre-configured backup paths to the controller.

Simulations of these processes have been performed on realistic topologies, including an Abeline network, a fat-tree like data center topology, and eight other real network topologies. The simulation data presented herein below also shows significant difference in the network resilience when placing the controller in the different places. The simulation results also show significant benefit of the optimal placement process in comparison with random and greedy processes.

Network Controller Location

The resiliency of the connection between the control plane and the forwarding plane is of great importance in split-architecture networks. If this connection is interrupted, then the forwarding plane will not know how to forward new flows (i.e., those flows with no existing rules in switches) and will lose its forwarding functionality. The embodiments of the invention provide a process to decide where to place the split-architecture controller, such that this connection (between the control plane and the forwarding plane) is less likely to be interrupted, Given a network topology, the process seeks to choose the right node in the network to locate the controller at that node. A good selection of a network's controller location must result in reliable paths from the switches to the controller, in the sense that each switch must have a backup (secondary) path to the controller which won't be affected by the same failure, in case its primary path fails.

Local Versus Centralized Routing Decisions

Handling of all failures by the controller could result in large delays in the network. Alternatively, a backup path can be pre-configured in each switch, so that if a primary output link is not working properly, a backup (secondary) output link could be used. OpenFlow, as an example controller-to-switch interface, introduces a group-table method for allowing a single flow match to trigger forwarding on multiple ports of the switch. Among the different types of groups, one is fast failover. This enables the switch to change over to another port without involving the controller. In configuring the backup path for control packets, a backup output link must be chosen such that it could be used (in case of failure on the primary link) to send the control traffic to the controller.

Protection Metric

In order to evaluate different controller placement strategies in a network (and to develop a policy for choosing a good location), a protection metric is utilized, which is based on node protection. This metric is applied to the split architecture to assess the network's resiliency against link failures, as will be explained further below.

Transient failures happen relatively frequently even in well-managed Internet Protocol (IP) networks. However, the network service is expected to be always available with the increasing demand on delivering critical services. With the high requirements on network reliability, the embodiments of the invention seek improve the resilience of the connectivity between the controller and the switches in a split architecture network.

The embodiments of the invention provide a process where the forwarding of data packets resumes after a failure as soon as possible. The existing interior gateway protocols (IGPs) such as open shortest path first (OSPF) and intermediate system to intermediate system (IS-IS) typically take several seconds to converge, which does not meet a sub-50 ms level of failure recovery time, which is expected for network reliability. The controller could detect the failures in switches or links using some implicit mechanisms, e.g., when hello messages are not received by the controller from a switch. However, this method will also introduce a large delay in the network for failure detection and service restoration.

In one embodiment, the decision of protection switching is made locally and independently (i.e. at the network element detecting the failure). This is different from the scenario in a traditional network, because the network element does not have a complete topology of the network. The network element is only a simple switch in the forwarding plane and only receives forwarding rules from the controller. When losing the connectivity to the controller, the switch has to make the decision of failover independently without any instructions from the controller. In other words, there will only be a local change in the outgoing interface of the affected switch. All other connections in the network will remain intact. In this manner the process keeps the forwarding element, i.e., the switch, as simple as possible.

In one embodiment, the controller is in the same physical network as the switches. That is, the existing infrastructure of the split architecture network (existing links and switches) is used to connect the controller to all the switches in the network, as opposed to using a separate infrastructure to connect the control and forwarding planes. In other embodiments, a separate network infrastructure is used for communication or any combination thereof.

As used herein, a network of switches is denoted by a graph $G=(V, E)$, where V is the set of nodes (switches and the controller) in the network and E is the set of bidirectional edges (links) between nodes. A cost is associated with each link in the network. Based on assigned link costs, shortest-path routes are calculated between any two nodes in the network. It is assumed that the cost on each link applies to both directions of the link. It is also assumed that there is no load balancing on the control traffic sent between the switches and the controller. Therefore, each node has only one path to reach the controller. In other words, the control traffic is sent from and to the controller over a tree, rooted at the controller, which will be refer to herein as a controller routing tree. This routing tree covers all the nodes in the network and a subset of the edges. The same routing tree is used for communications between the controller and the switches in both directions.

Figure 2:
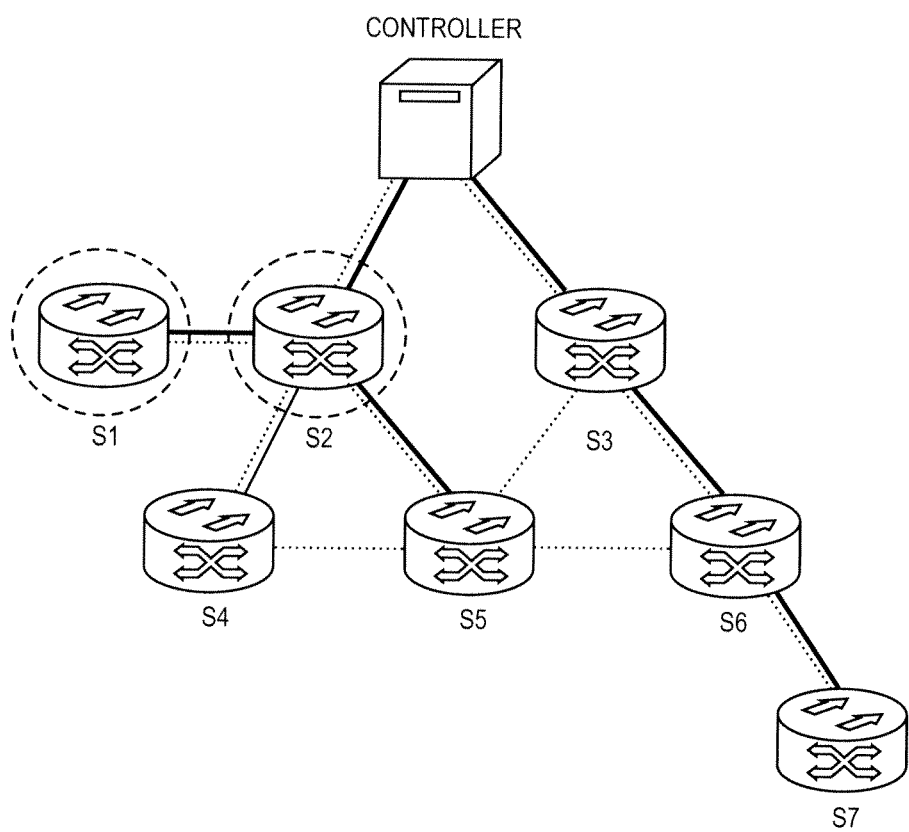
FIG. 2 is a diagram of one embodiment of a split architecture network contains both protected and unprotected switches.

With a given controller location, any shortest-path routing protocol forms a tree T, rooted at the controller node, which covers all the nodes and a subset of the edges. As mentioned above, this tree is referred to as the controller routing tree. FIG. 2 shows a network and its controller routing tree. In this figure, the dashed lines show all links in the network, and the solid lines show the links used in the controller routing tree. Each node can reach the controller by sending its control traffic along the paths in the controller routing tree. We assume both directions of each link have the same cost, and therefore, the same routing tree will be used for communications between the controller and the switches in both directions.

In the controller routing tree T, node u is an upstream node of node v if there is a path in T from node v to node u towards the controller. Node u is called a downstream node of node v if there is a path in T from node u to node v towards the controller. In the network depicted in FIG. 2, for example, node S3 is an upstream node of nodes S6 and S7, and these two nodes are downstream nodes of node S3. In the controller routing tree, a node's parent is its immediate upstream node and a node's children are its immediate downstream nodes. Because of the assumed tree structure, each node has only one immediate upstream node in T. In the example and in the embodiments of the controller placement process, it is assumed that there is no load balancing on the control traffic sent from the switches to the controller. That is, we assume each node in the network has only one immediate upstream node in T. The symbols introduced herein (e G, T, u and v) are used herein below to represent these concepts for sake of clarity and accuracy.

Node Versus Link Failure

With a given controller location and controller routing tree T, consider node a and its immediate upstream node b. As used herein, node a is protected against the failure of its outgoing link (a,b) if there exists node c with the following conditions:

Condition 1. (a,c) is in G (i.e., there is a link between nodes a and c in the network); and Condition 2. Node c is not a downstream node of node a in T.

The second condition guarantees that a loop will not be created as a result of connecting node a to node c.

If the above conditions are met, then link (a,c) could be assigned as the backup link for link (a,b) and this backup link could be preconfigured in node a. As soon as node a detects a failure in link (a,b), it will immediately change its route to the controller by changing the primary link (a,b) to the secondary link (a,c).

As used herein, node a is also protected against the failure of its immediate upstream node, if node c satisfies another condition in addition to the above conditions:

Condition 3. Node c is not a downstream node of node b in T.

This condition guarantees that the control traffic of node c towards the controller will not pass through node b (which is assumed to have failed). Again, as soon as node a detects a failure in node b, it switches its outgoing link over from (a,b) to (a,c).

In the network shown in FIG. 2, for example, switches S1, S2, and S7, are not locally protected, i.e., if their outgoing links (or upstream nodes) fail, no backup links can be chosen and pre-configured to be used. Switch S4 is protected against its output link failure, i.e., if link (S4,S2) fails, link (S4,S5) could be used instead. However, S4 is not protected against its immediate upstream node (S2) failure. Because the backup path (S4,S5,S2, controller) will pass through S2.

Switch S6 is protected against both its outgoing link and its immediate upstream node failures: If link (S6,S3) or node S3 fails, the control traffic of S3 will be sent over link (S6,S5) and it will not pass through node S3. Depending on how critical or frequent link failures are versus node failures in the network, the network operator can assign different weights to these two kinds of failures, e.g., weight w1 for link failure and weight w2 for node failure. This way, the protection level of a node could be evaluated at w1 if it is protected only against its outgoing link failure and at w1+w2 if it is protected against its immediate upstream node failure as well. For those switches directly connected to the controller, the upstream node protection cannot be defined (as the immediate upstream node would be the controller). For those nodes, therefore, the protection weight would be w1+w2 if they are protected against their outgoing link failure.

In another example, $\alpha=\beta$ could be interpreted and used for scenarios where link and node failures are equally likely—or when it is equally important to protect the network against both kinds of failures. This way, the cost of not having protection at a node could be evaluated at $\alpha+\beta$ if the node is not protected at all, at $\alpha$ if it is protected only against its outgoing link failure, and at zero if it is protected against the upstream node failure as well. For those switches directly connected to the controller, the upstream node protection cannot be defined (as the immediate upstream node is the controller). For those nodes, therefore, the assigned cost is zero—if they are protected against their outgoing link failure, and is $\alpha+\beta$ otherwise.

Downstream Versus Upstream Nodes

In one embodiment, it is assumed that traditional failure management tools are deployed in the split-architecture network, i.e., there is no extended signaling mechanism for a node to inform its downstream nodes of a failure. Therefore, if a switch is disconnected from the controller (i.e., if there is no backup path programmed in the switch), then all its downstream nodes will also be disconnected, even if they are themselves locally protected against their outgoing links or immediate upstream nodes failures. This means that in evaluating networks resiliency, more weights are assigned to nodes closer to the controller (which is the root of the controller routing tree). More precisely, the weight of each node is also proportional to the number of its downstream nodes.

In FIG. 2, for example, failure of the link between S2 and the controller results in the disconnection of all S1, S2, S4, and S5 from the controller. This failure costs four times more compared to when the link (S1,S2) fails, which only disconnects S1 from the controller.

Implementation of Protection Using OpenFlow

In one embodiment, the controller placement process can be applied to any implementation of a split architecture network. The forwarding table in an OpenFlow switch, for example, is populated with entries consisting of a rule defining matches for fields in packet headers, a set of actions associated with the flow match, and a collection of statistics on the flow. The OpenFlow specification version 1.1 introduces a method for allowing a single flow-match trigger forwarding on more than one ports of the switch. Fast failover is one of such methods. Using this method, the switch executes the first live action set. Each action set is associated with a special port that controls its liveness. OpenFlow's fast failover method enables the switch to change forwarding without requiring a round trip to the controller.

Controller Placement Process

The protection of nodes in a network depends on both the selection of the primary paths (for a given controller location) and the choice of the controller location. As set for below, a general routing policy is defined, which, for each choice of the controller location, selects the primary paths in the network for reaching the controller. This selection could be based on any desired metrics, e.g., performance metrics like delay or load. Also discussed are what a thorough search includes to find the best location for this arbitrary selected primary paths.

Figure 3:
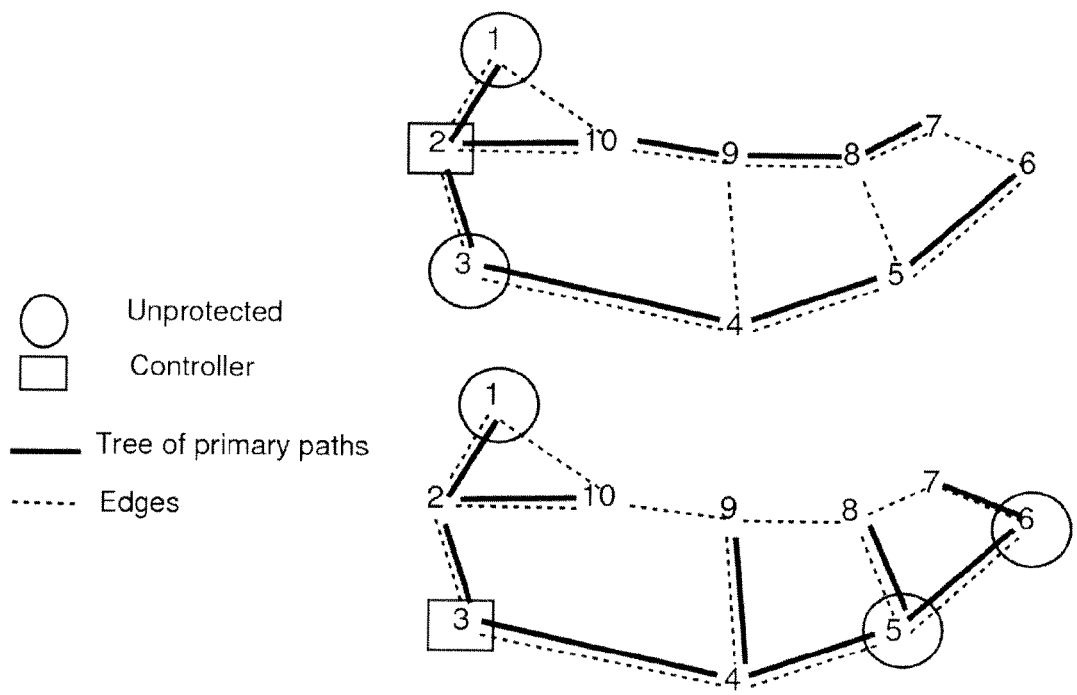
FIG. 3 is a diagram of an example Abeline network.
Figure 4:
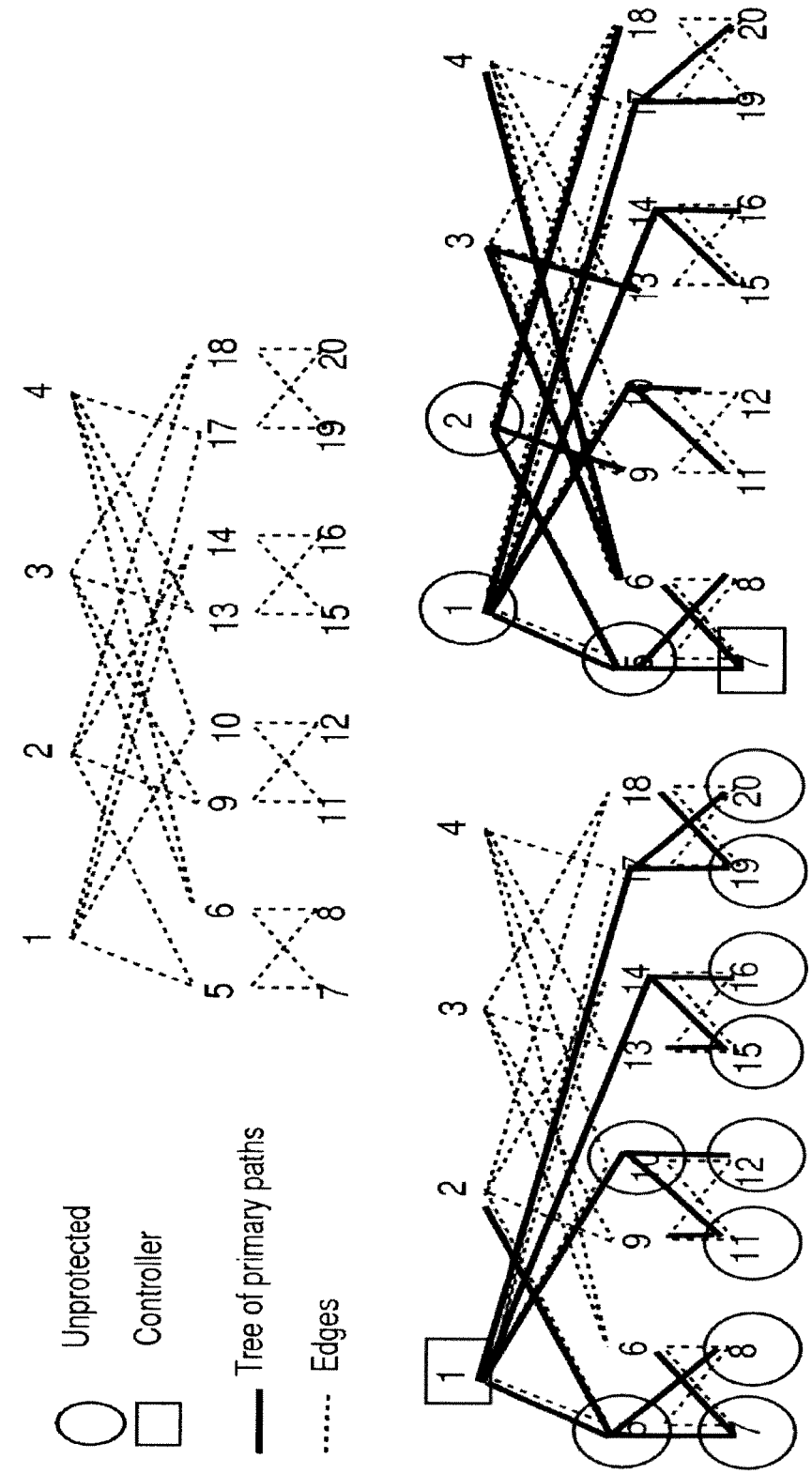
FIG. 4 is a diagram of an Example of Fat-tree network.

Two network topologies shown in FIG. 3 and FIG. 4 and are used to illustrate how the controller location could affect the protection of a network with a split architecture. The shortest-path policy is used for selecting the primary paths in both examples.

FIG. 3 shows the Internet2 topology with 10 nodes and 13 edges. Here two examples of controller selection are illustrated, deploying a controller on node 2 and node 3. The location of the controller is shown in rectangular boxes. For each controller deployment, the shortest path tree to all other nodes is computed, rooted in the controller. The primary paths in the tree are shown in solid lines. For each switch, its back-up path is computed according to the definition discussed above. The nodes without any protection are shown in circles. In this example, it can be seen that the upper case is a better solution, since only 2 nodes are unprotected. In particular, node 5 is protected by node 8 in the upper figure but not in the bottom figure since it is the parent of node 8 in the primary path.

The split architecture network design also raises a large amount of interest for use in data centers. FIG. 4 shows another example in fat tree like data center networks, containing 20 nodes and 32 links. Similarly, two scenarios are illustrated, deploying controller on node 1 and on node 7. The two shortest path trees are constructed rooted from the controller respectively. It can be seen that node 7 is a much better location for controller compared to node 1. This is very counter-intuitive, as node 1 is a core nodes in the fat tree structure and is expected to be more resilient. When node 1 is the controller, 10 nodes are unprotected, including all the leaf nodes. With node 7 as the controller, only 3 nodes are unprotected. For example, node 11 is protected by node 9 when its parent in the primary path (node 10) fails.

From these two examples, it can be observed that: first, the controller's location does have large impact on the number of protected nodes in the network; and second, the selection of controller's location can be quite counter-intuitive.

Figure 5:
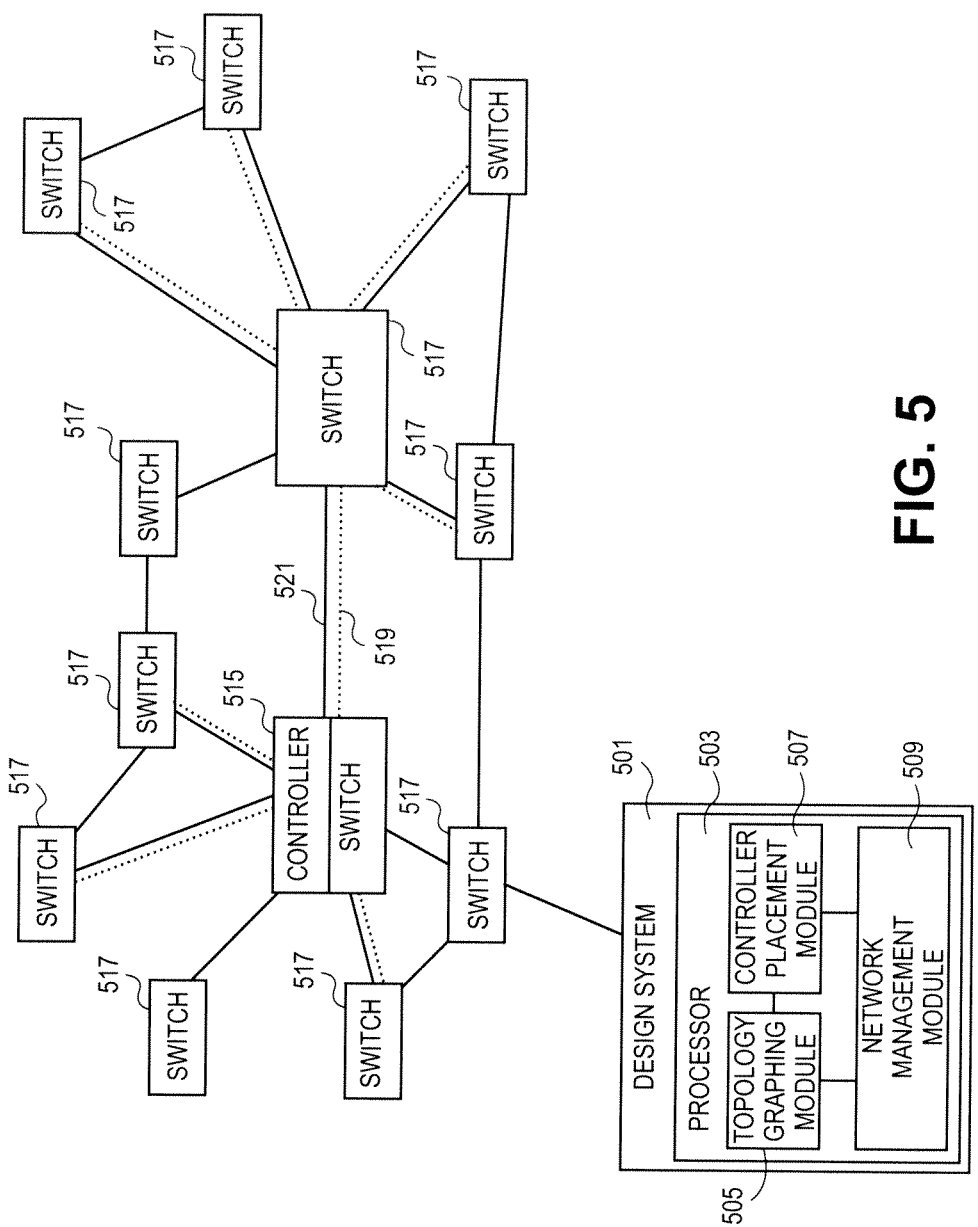
FIG. 5 is a diagram of one embodiment of a design system coupled to a network with optimized controller placement

Design System Architecture and Example Network with Optimized Controller Location FIG. 5 is a diagram of one embodiment of a design system coupled to a network with an optimized controller placement. The diagram provides an illustration of an example network design system 501 to execute the network design system tool. The network design system 501 can be any type of computing device including a desktop computer, a server, a handheld computing device, a console device, a laptop device or similar computing device. The network design system 501 includes a set of processors 503 to run the components of the network design system tool including a topology graphing module 505, a controller placement module 507 and similar components. In other embodiments, any or all of these modules can be implemented as a set of hardware modules or devices. The processor 503 can also execute a network management module 509 to communicate with and/or manage the split architecture network.

The topology graphing module 505 can convert a network topology into a representative graph and perform graphing functions on the representative graph to support the controller placement module 507. The controller placement module 507 operates on the graph generated by the topology graphing module 505 and directs graphing operations to implement an optimal placement process or a 'greedy' placement process to determine a location for a controller.

The network management module 509 can communicate with the controller placement module 503 and/or the topology graphing module 505 to discover the network topology for an automated process and/or to implement controller placement in an automated process. In other embodiments, the controller placement module 507 generates a report or similar output to a user for implementing a network organization and the network management module 509 can be omitted.

The illustrated split architecture network is an example implementation with example controller placement consistent with the controller placement optimization. In the example, there is a controller 515 to control domain or split architecture area consisting of switches 517. The switches 517 are manages by the controller 515 using the controller routing tree 519 shown as a dotted lines connecting the switches 517, where the solid lines 521 are the links between the switches 517. The process for determining the controller 515 location is described herein below.

Optimized Controller Location for Fast Failover

Figure 6:
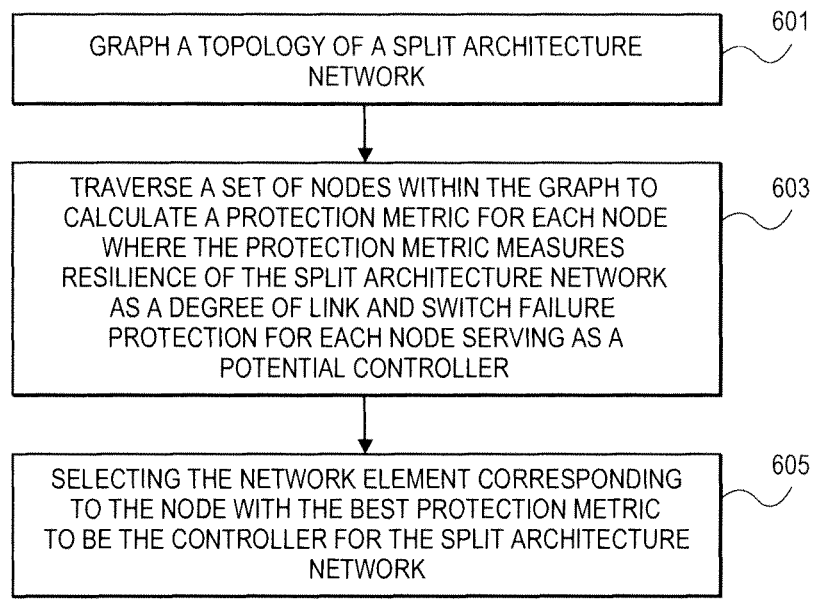
FIG. 6 is a flowchart of one embodiment of an controller placement optimization process

The general controller placement process is described in regard to FIG. 6. The input of the controller placement process is the network's topology graph G=(V, E), and the output is the controller_location, i.e., the network node at which the controller will be located.

The general controller placement process is initiated by graphing the topology of the split architecture network (Block 609). The nodes and links between the nodes can be determined by administrator input, automated discovery processes or any combination thereof. The graph represents network elements in the network as nodes in a graph with the communication links between these network elements represented as links or edges in the graph.

The process then traverses the nodes in the graph to calculate a protection metric for each node in the graph (Block 603). The protection metric as described herein above and further herein below, measure resilience of the split architecture network as a degree of link and switch failure protection for each possible controller location within the network, i.e, for each possible node in the network that can host the controller.

Once the protection metric is determined for each node in the graph, the network element corresponding to the node in the graph with the best protection metric is selected (Block 605). The selected network element is then output to the network administrator for manual implementation or to a network management module for automated implementation or any combination thereof.

There are two more specific example processes for traversing the graph and determining the protection metric for the nodes therein. In the first process—an optimal placement process—all possible locations for the controller are searched and the one that maximizes the number of protected switches is chosen. In a second process—a 'greedy' process, a faster and simpler traversal of the nodes is made with a more approximate evaluation.

Controller Placement—Optimal Placement Process

One embodiment of the process is illustrated below in Table I as psuedocode.

TABLE I

Optimal Placement Process 1. for each node v in V do
2.    T = Controller routing tree rooted at v
3.    for each node u ≠ v do
4.       weight(u) = number of downstream nodes of u in T
5.       If (conditions (1) and (2) are satisfied ) then
6.          weight(u) = weight(u) * w1
7.          If (u is directly connected to the controller) or (if condition (3) is satisfied) then
8.             weight(u) = weight(u) * (w1 + w2)
9.       endif
10.    endif
11.   endfor
12.   weight(T) = sum of the weights of its nodes
13. endfor
14. controller_location = node v with maximum weight (T)

As briefly described in the previous section, the protection metric for each node in a graphed network is based on the weight of a tree rooted at that node. The weight of the tree is calculated where each node in the tree has a weight that is calculated initially as the number of its downstream nodes (line 4). Then this number is multiplied by the protection level of the node (lines 5-10), which is:

w1, if the node is only protected against its outgoing link failure (Conditions 1 and 2);

w1+w2, if the node is protected against both its outgoing link and its immediate upstream node failures (Condition 3); and 0, otherwise.

The weight of the tree is the sum of the weights of its nodes. The final step of the process is to find the controller location that maximizes the weight, i.e., minimizes the chance that a node is disconnected from the controller.

Figure 7:
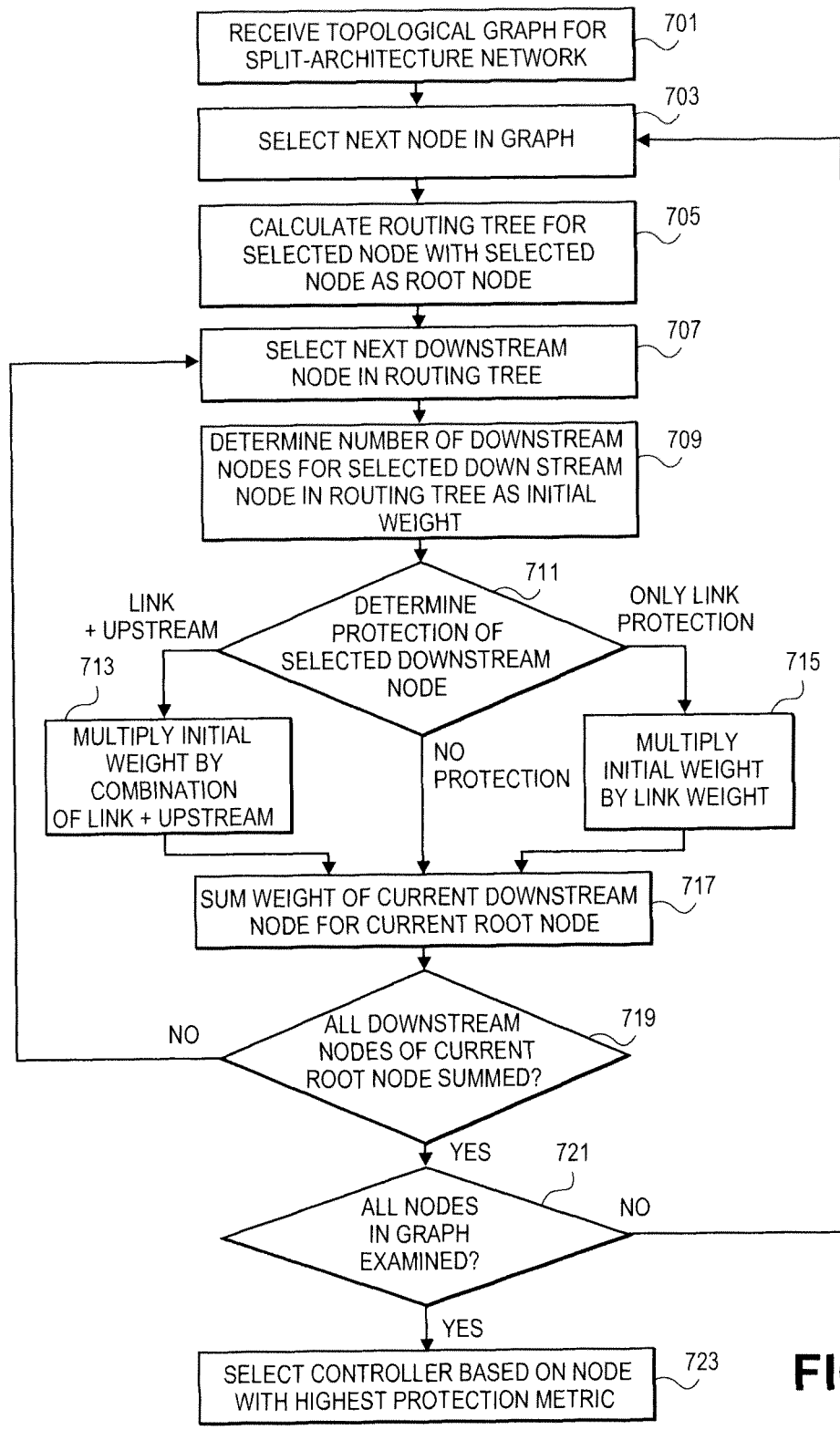
FIG. 7 is a flowchart of one embodiment of an optimal controller placement process

This process is described in relation to the flowchart of FIG. 7. The optimal placement process is initiated by the controller placement module in response to receiving a topological graph of the split architecture network from the topology graphing module (Block 701). The process then starts to iterate through each of the nodes in the graph (Block 703). The nodes can be iterated through serially or in parallel as the order of evaluation is not important as each node is to be examined and a protection metric generated for it.

For each node in the graph a controller routing tree is generated with the given node serving as the root of the tree (Block 705). Then for each of these routing trees the nodes within these trees are traversed (Block 707). The order of traversal of the nodes within the routing trees is not important and each can be examined in parallel or serially. For each node in each routing tree a determination of protection is initially made of the number of downstream nodes (Block 711). This number of downstream nodes serves as an initial weight for the calculation of the overall routing tree weight. If the node in the routing tree has protected downstream nodes and a protected upstream node then the initial weight is multiplied by a combination of these values (Block 713). If the node in the routing tree has only protected downstream nodes, then the initial value is multiplied by this number (Block 715). If there are no upstream or downstream protected nodes relative to this node then the node has a zero value.

After each of the nodes in a routing tree has its weight determined as described above, then each of these weights is summed to determine a weight for the routing tree for the node rooted in this tree (Block 717). This summation process can be done iteratively, in which case a check is made to determine if additional nodes in the tree need to be examined (Block 719). The summation process can also be done is a parallel process or similar process.

Similarly, a check is made to determine if all the nodes in a graph have been reviewed to determine a weight of their respective controller routing tree (Block 721). This weight of the controller routing tree can be the protection metric for the corresponding root node. Once all of the protection metrics for all of the nodes in the graph have been calculated, then the node with the best protection metric can be selected to be assigned the controller (Block 723).

Controller Placement—Greedy Placement Process

If the size of the split architecture network is large, then a thorough search among all locations could become very complex. In this second process, we introduce a greedy way of finding a location with rich connection among its directly connected switches. In this process, the degree of a node v (number of its neighbors in G) is denoted by D(v). The process starts by picking node v(1), the first node from an ordered list of network nodes, sorted in a decreasing degree order.

TABLE II

Greed Placement Process

1. Sorts nodes in V such that $D(v(1)) \geq D(v(2)) \geq ... \geq D(v(n))$
2. controller_location set as v(1)
3. for i = 1 to n do
4.     A=set of neighbors of node v(i)
5.     $D'(v(i))$= number of members of A that are connected to other members – either directly or through one hop other than the controller
6.     if $D'(v(i)) > D'$(controller_location) then
7.         controller_location←v(i)
8.     endif
9.     i←i + 1
10.    if $(D'(v(i)) == D(v(i))$ then break;
11.    endif
12. endfor The goal in this process is to find the node with the maximum number of protected neighbors. Here, $D'(v)$ denotes the number of protected neighbors of node v. In the ith iteration of the process, the number of protected neighbors of node v(i) are calculated (line 5), and the controller location is updated to node v(i) if it beats—in terms of the number of protected neighbors—the previously searched nodes (lines 6-8). The process stops when it finds the node with the maximum number of protected neighbors, which will be chosen as the node where the controller will be located at.

The protection metric used in this process is the maximum number of protected neighbors. As explained before, the nodes closer to the controller weigh more (than those further from the controller), because if their connection to the network is interrupted, all their downstream nodes will be affected and disconnected. Therefore, it is important to pick a location for the controller such that its neighbors—i.e., those switches that are directly connected to the controller, are well protected.

Figure 8:
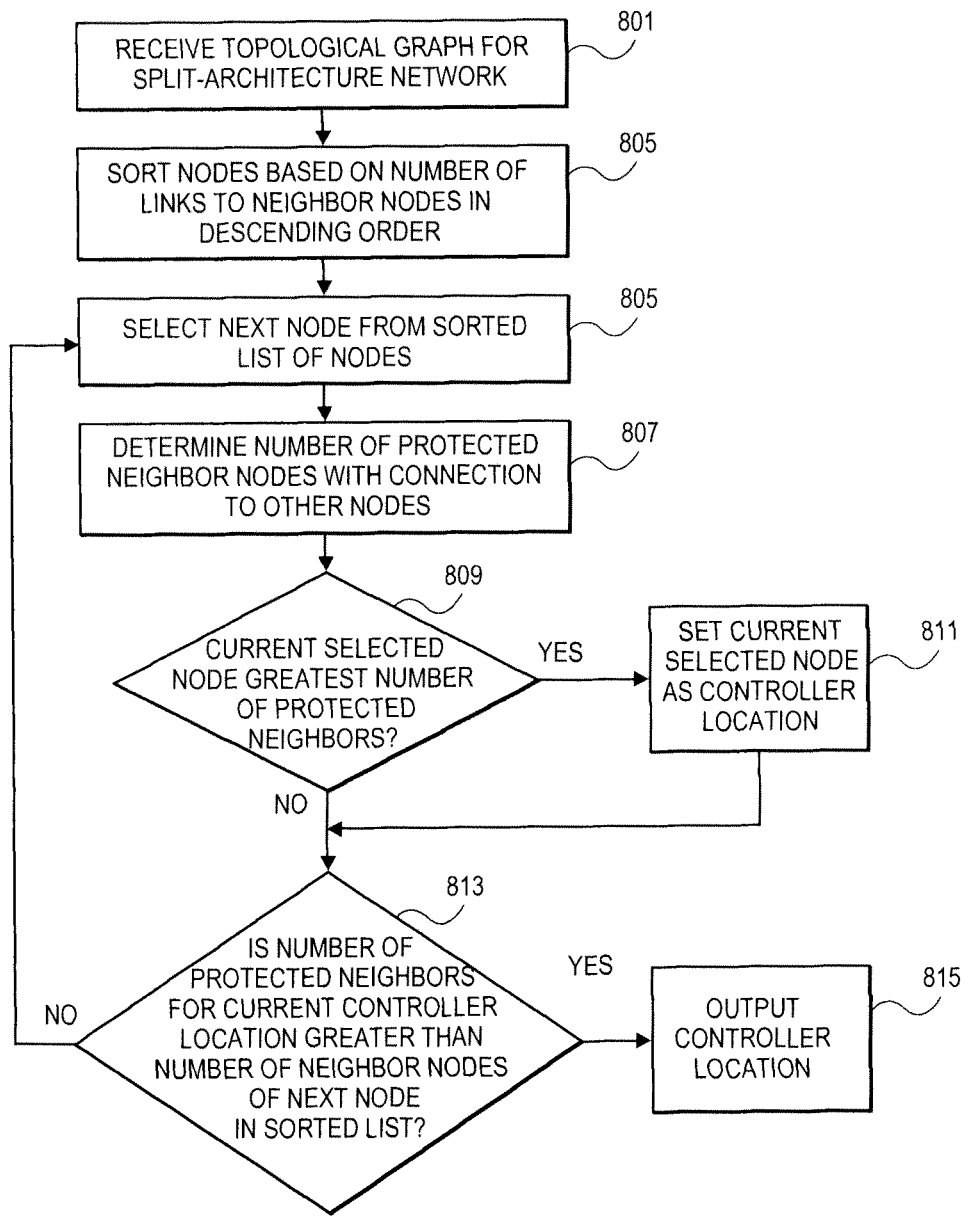
FIG. 8 is a flowchart of one embodiment of a 'greedy' controller placement process

FIG. 8 is a flowchart of one embodiment of the greedy placement process. The process can be initiated by receiving a topological graph of the split architecture network by the controller placement module (Block 801). The set of nodes are then examined to determine the number of links to neighboring nodes for each of the nodes in the graph. The nodes are then sorted based on this assessment of the number of neighbors (Block 803). Initially the node with the most neighbor links is set as the default or current location for the controller. The process then begins to iterate through each of sorted nodes starting with the node with the highest number of neighbors and progressing through the sorted list in descending order (Block 805).

The selected node is then analyzed to determine the number of the links to neighbors that are protected (Block 807). A check is then made to compare this nodes number of protected links to the number of protected links of the node set as or initially selected as the current location (Block 809). If the node being analyzed exceeds the current location node then, the current location nodes is updated. The process continues by checking if the number of protected nodes of the current location node is less than the number of neighbors for the next node to be examined. If the number of protected nodes exceeds the next node in the sorted list's number of neighbors, then the process can complete and output the current selected node to be used as the controller placement location (Block 815). Otherwise, the process continues to the next node in the sorted list.

Network resilience is one of the most important factors in evaluating any network designs. A failure of a few milliseconds may easily result in terabyte data losses on the links of high speed transmission rates. From the practical deployment's perspective, these processes for optimized controller location maximize the resilience between controller and the switches in the split architecture. These processes maximize network's resilience by maximizing the number of switches with preconfigured backup paths. In case of failures, the affected forwarding elements could immediately switch over to their back up paths and restore their connections with the controller.

The embodiments of the invention can provide guidelines for the operators to deploy their network in a cost-effective mariner. They can improve the resilience of the split architecture network, which can prevent hundreds of thousands of flows being affected by transient failures.

Use of Split Architecture Networks

A split-architecture network can be deployed for cellular backhaul to support MPLS based forwarding. In LTE, it can be also deployed in the mobile core to route the user traffic between the MME, Serving-GW and PDN-GW. In this case, the controller can be implemented in multiple sites or multiple locations in one site. The processes in this invention can be used to calculate the best location for controller placement.

When multiple technologies co-exist, e.g. GSM, 3G, LTE, they may share the same packet transport networks. In this example, a common set of controllers can be used to control packet switching functions for all networks together. This invention can be used to determine the location of controller for controlling multiple technology networks.

In cloud computing, especially data center networks, to reduce the cost of networking infrastructure, split architecture with a smart controller and a set of low-cost switches is preferred. In the data center network environment, the controller placement process can be applied to deploy controllers.

Simulation Results

In this section, simulation is used to verify the analytical models and processes in both synthetic and realistic network topologies. The impact of the controller's location is quantified for the resiliency of the split architecture network.

In the simulation, the controller placement strategies are studied and its impact on the protection on three different networks, i.e., the educational backbone network Abeline, the data center Fat-tree, and the cellular network with three levels of hierarchies. For each topology, the protection under different controller selection strategies is presented. The goal is to investigate how the protection metric changes as the controller's location changes. Next, our process on 8 other real network topologies are evaluated, including 5 Tier-1 networks, 1 Tier-2, 2 Tier-3 and 1 Enterprise network. Since there is no existing work on the resilience analysis on split architecture network, a simulation tool in perl was implemented.

Figure 9:
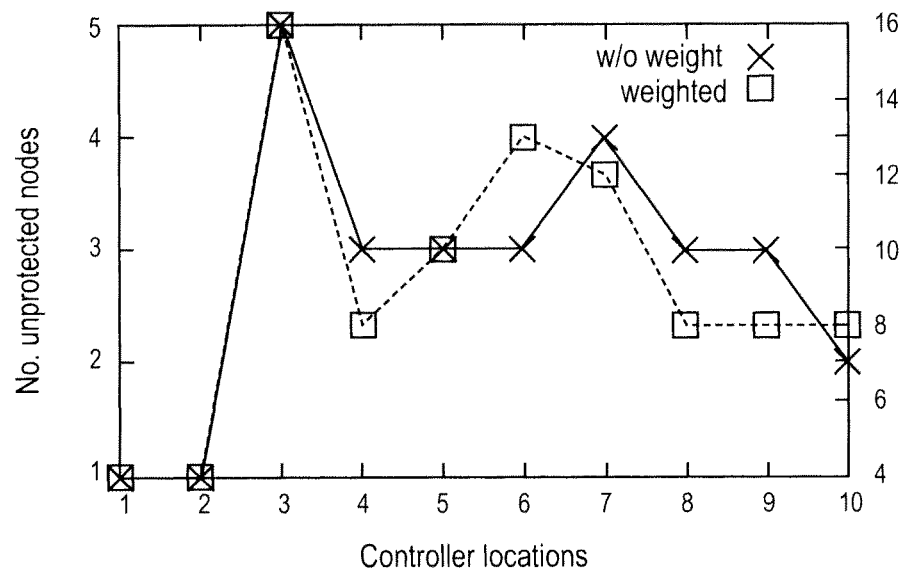
FIG. 9 is a diagram of protection with different placement locations for an Abeline network.

First it is demonstrated the number of unprotected nodes in Abeline topology in FIG. 9. The x-axis enumerates all the possible locations in the topology, the index of which is the same as FIG. 3. The left y-axis shows the number of unprotected nodes and the right y-axis shows the metric with weights. More specifically, two metrics are computed, the "w/o weight" plot counts the total number of unprotected individual nodes. The "weighted" plot is the summation of unprotected nodes weighted by its number of children beneath it.

Figure 10:
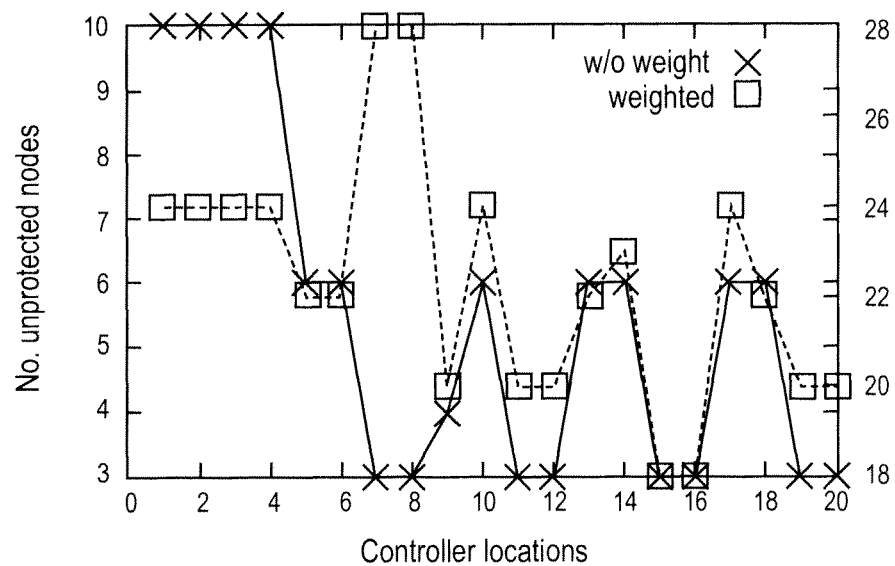
FIG. 10 is a diagram of protection with different placement locations for a Fat-tree network.
Figure 11:
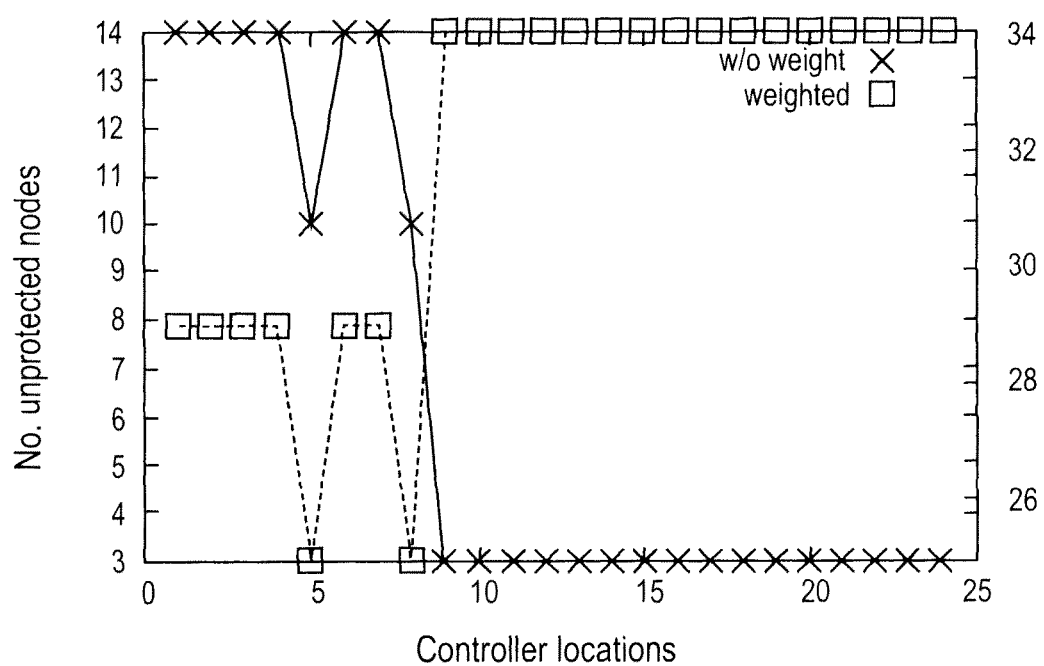
FIG. 11 is a diagram of protection with different placement locations for an access network.

FIG. 10 presents the same metrics on the Fat-tree topology and FIG. 11 for the cellular topology. From all three figures a significant difference in protection metrics is observed with different controller locations.

TABLE III

Best protection in different topologies

| Topology | Tier | # of nodes | # of links | Random | Greedy | Optimal |
|---|---|---|---|---|---|---|
| Deutsche Telekom | 1 | 39 | 62 | 41 | 26 | 2 |
| NTT | 1 | 49 | 214 | 56 | 49 | 32 |
| Quest | 1 | 18 | 31 | 24 | 12 | 6 |
| Sprint | 1 | 11 | 18 | 6 | 4 | 2 |
| UUNet | 1 | 48 | 84 | 89 | 38 | 28 |
| AboveNet | 2 | 23 | 31 | 49 | 33 | 32 |
| Geant | 3 | 37 | 57 | 70 | 25 | 25 |
| Abeline | 3 | 10 | 13 | 9 | 8 | 4 |
| IBM | 4 | 17 | 24 | 24 | 19 | 13 |
| Fat-tree | — | 20 | 32 | 22 | 24 | 18 |

The optimal placement process is then run on multiple real topologies and shown as the number of unprotected nodes in the best scenario. Table III shows a summary of the topologies and its best protection. Some well-connected networks with a large number of edges, e.g., NTT have worse resilience in terms of protection.

In one embodiment, the resilience of the newly proposed network architecture is investigated where the controlling and forwarding planes are separated. One example of such architecture is the OpenFlow network, which has drawn significant interests in both academia and industry recently. However, one of the largest concern to these proposals is its resilience to failure, especially the loss of connectivity between the switches and the controller. In the controller placement process described herein, a protection mechanism has been presented to improve the resilience of the split architecture. This is the first to study the protection schemes for connectivity between controllers and switches in this new network architectures. From the analysis using various realistic network topologies including Abeline network and Fat-tree, the location of the controller is found that can provide significant affect on the protection metrics. Motivated by this observation, two controller placement processes are provided given a fixed forwarding plane. The simulation results show that it outperforms random and greedy schemes with significant protection improvements.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network topology design system, the network topology design system including a processing device, the method to determine placement of a controller within a network with a split architecture where control plane components of the split architecture network are executed by a controller and the control plane components are separate from data plane components of the split architecture network, wherein the placement of the controller is selected to minimize disruption of the split architecture network caused by a link failure, a switch failure or a connectivity loss between the controller and the data plane components, the method comprising the steps of:

graphing, by the network topology design system, a topology of the split architecture network, with links in the split architecture network represented as a set of edges in a graph and network elements in the split architecture network represented as a set of nodes;

traversing the set of nodes within the graph to calculate a protection metric for each node, wherein the protection metric measures resilience of the split architecture network as a degree of link and switch failure protection within the split architecture network for a potential controller placement at each node;

selecting the network element corresponding to the node with a best protection metric to be the controller for the split architecture network;

determining a link protection weight for each node in a routing tree as a number of protected links to downstream nodes in the routing tree;

determining an upstream node protection weight for each node in the routing tree as a number of protected upstream links to the controller; and multiplying an initial weight by the link protection weight or the link protection weight and the upstream node protection weight to obtain a weight for each node in the routing tree.

2. The method of claim 1, wherein traversing the set of nodes to calculate the protection metric further comprises the step of:
calculating a routing tree for each node with the node at a root of the routing tree.

3. The method of claim 1, wherein traversing the set of nodes to calculate the protection metric further comprises the steps of:
determining a number of downstream nodes in the routing tree for each node in the routing tree; and
setting the number of downstream nodes as an initial weight in the protection metric for each node in the routing tree.

4. The method of claim 1, wherein traversing the set of nodes to calculate the protection metric further comprises the step of
summing all node weights in each routing tree to obtain the protection metric for each node in the split architecture network.

5. The method of claim 1, wherein traversing the set of nodes to calculate the protection metric further comprises the step of:
sorting the set of nodes in descending order based on a number of links to neighbor nodes for each node.

6. The method of claim 5, wherein traversing the set of nodes to calculate the protection metric further comprises the step of:
determining a number of protected neighbor nodes with a connection to other nodes.

7. The method of claim 6, wherein selecting the network element corresponding to the node with a best protection metric to be the controller for the split architecture network comprises the step of:
selecting a node with a largest number of protected neighbor nodes to be the controller.

8. A network with a split architecture where control plane components of the split architecture network are executed by a set of controllers and the control plane components are separate from data plane components of the split architecture network, wherein a placement of a controller of the set of controllers is selected to minimize disruption of the split architecture network caused by a link failure, a switch failure or a connectivity loss between the controller and the data plane components, the network comprises:
a set of network elements interconnected by a set of communication links, each network element in the set of network elements executing a switch that is controlled by and in communication with the controller; and
the controller executed by one network element of the set of network elements, wherein a position of the network element in a first set of network elements within the split architecture network provides an optimized number of protected links between the controller and each of the network elements in the first set of network elements, the optimized number corresponding to a highest value of a protection metric for the network element in the first set of network elements, wherein the protection metric measures resilience of the split architecture network as a degree of link and switch failure protection within the split architecture network, where the position of the network element within the split architecture is determined by graphing a topology of the split architecture network, with links in the split architecture network represented as a set of edges in a graph and network elements in the split architecture network represented as a set of nodes, traversing the set of nodes within the graph to calculate a protection metric for each node, wherein the protection metric measures resilience of the split architecture network as a degree of link and switch failure protection within the split architecture network for a potential controller placement at each node, selecting the network element corresponding to the node with a best protection metric to be the controller for the split architecture network, determining a link protection weight for each node in a routing tree as a number of protected links to downstream nodes in the routing tree, determining an upstream node protection weight for each node in the routing tree as a number of protected upstream links to the controller, and multiplying an initial weight by the link protection weight or the link protection weight and the upstream node protection weight to obtain a weight for each node in the routing tree.

9. The network of claim 8, wherein the first set of network elements form a data plane of an evolved packet core (EPC) in a long term evolution (LTE) network, and the controller provides a control plane of the EPC in the LTE network.

10. The network of claim 8, wherein the first set of network elements form a set of data planes for a plurality of cellular network technologies, and the controller provides a control plane for each of the plurality of cellular network technologies.

* * * * *

UNITED STATES PATENT AND TRADEMARK OFFICE
CERTIFICATE OF CORRECTION

PATENT NO.        : 8,804,490 B2                                    Page 1 of 1
APPLICATION NO.   : 13/236296
DATED             : August 12, 2014
INVENTOR(S)       : Tatipamula et al.

It is certified that error appears in the above-identified patent and that said Letters Patent is hereby corrected as shown below:

In the Specification

In Column 7, Line 16, delete "(e G, T, u and v)" and insert -- (e.g., G, T, u and v) --, therefor.

In Column 9, Line 58, delete "module 503" and insert -- module 507 --, therefor.

In Column 13, Line 15, delete "mariner." and insert -- manner. --, therefor.

Signed and Sealed this
Nineteenth Day of May, 2015

Michelle K. Lee
*Director of the United States Patent and Trademark Office*